United States Patent [19]

Amster

[11] 4,091,422
[45] May 23, 1978

[54] APPARATUS FOR SELECTIVELY TRANSMITTING TELEVISION IMAGES FROM A PLURALITY OF CAMERAS TO A MONITOR

[76] Inventor: Gerald Amster, 100 Beekman St., New York, N.Y. 10038

[21] Appl. No.: 749,392

[22] Filed: Dec. 8, 1976

[51] Int. Cl.² .................. H04N 5/22; H04N 7/00
[52] U.S. Cl. .................................................. 358/210
[58] Field of Search .................... 179/2 TV, 2 TS; 358/108, 142, 146, 147, 210

[56] References Cited

U.S. PATENT DOCUMENTS

| | | | |
|---|---|---|---|
| 3,258,531 | 6/1966 | Reindl et al. | 358/210 |
| 3,437,753 | 4/1969 | Stith | 358/210 |

Primary Examiner—Robert L. Richardson
Attorney, Agent, or Firm—Haseltine, Lake & Waters

[57] ABSTRACT

A system for selectively transmitting television images includes a plurality of television cameras for generating image signals. The cameras may be placed at different respective locations, and at least a single television monitor-receiver is provided for selectively receiving and monitoring one of the image signals. The monitor-receiver includes a circuit for generating common line and field synchronizing signals for the cameras, and an activation-signal generating circuit for supplying activation signals for the cameras, respectively. The activation and synchronizing signals are transmitted to the cameras, respectively, by cable or radio-frequency.

7 Claims, 21 Drawing Figures

APPARATUS FOR SELECTIVELY TRANSMITTING TELEVISION IMAGES FROM A PLURALITY OF CAMERAS TO A MONITOR

FIELD OF THE INVENTION

The field of the present invention relates to a system for selectively transmitting television images from a plurality of television cameras to a single television monitor-receiver.

BACKGROUND OF THE INVENTION

A number of systems are known for multiplexing a plurality of television signals onto a single transmission means, for example, a cable; multiplexing of television signals can be performed either by frequency multiplexing television signals, i.e., choosing different respective carriers for being modulated by the respective television signals, and transmitting the carriers over a single transmission means. Alternatively, the television signals can be time-division multiplexed, which means chopping the signals up into very small incremental intervals, and transmitting these incremental intervals in a time-division multiplexed manner. This can, in turn, be done either by analog means, or by converting the signals into digital signals, and reconverting the digital signals into analog signals at the monitor-receiver.

The multiplexing methods of the prior art are all costly and complex, and in particular require a bandwidth which is usually a multiple of the bandwidth required for a single television channel, and at least equal to $n$ times the bandwidth of a single channel, where $n$ is the number of television channels to be transmitted. Although sophisticated bandwidth-reduction methods have been proposed, they have generally not been able to reduce the bandwith significantly. A television system which transmits auxiliary information during the vertical blanking interval of each television field has also been proposed, but such a system is not applicable for selectively choosing one of a plurality of television transmitters for transmitting video signals to the monitor-receiver. This is particularly true where the transmitters relaying the camera-generated video signals all operate on the same radio frequency.

There is also known a television multiplexing system which includes a circuit that inserts a digital coded sync signal and a digital code into a video signal for activation the channel from which the video signal was generated, so that a plurality of signals can be sent over a single hard or dedicated line. The digital sync signal and the digital coded signals are generated by a single crystal controlled clock, so that they are always in synchronism with each other. In demultiplexing the signals, so as to feed the video signal to a proper recording channel, the sync signals are utilized for shifting the digital coded signals into a shift register, and the shift register, in turn, activates a decoder according to the code stored in the shift register for selecting the proper recording disc or receiver for storing the video signal.

OBJECTS OF THE PRESENT INVENTION

It is, therefore, an object of the present invention to devise a system for selectively transmitting one of a plurality of television images from one of several cameras to a monitor station. It is another object of my invention to transmit such signals via either a cable or the ether; it is a further object of my invention to minimize the bandwidth required in transmitting a command signal to one of the television transmitters, and receiving the video signal from that television transmitter. It is a further object of my invention to control the positioning of the camera, generating the video signals, in azimuth and elevation.

SUMMARY OF THE INVENTION

I accordingly provide a system for selectively transmitting television images which includes a plurality of television cameras for generating image signals, and wherein the cameras may be placed at different respective locations, and at least a single television monitor-receiver for selectively receiving and monitoring one of the image signals. The monitor-receiver includes means for generating common line and field synchronizing signals for the cameras, and activation-signal generating-means for generating activation signals for the cameras, respectively. The activation signals and the synchronizing signals may be transmitted to the cameras, respectively, via transmission means.

Each of the cameras preferably includes a radio-frequency transceiver, and the monitor-receiver includes a radio frequency transmitter for transmitting the synchronizing and activation signals to the transceiver, the latter being connected to respective cameras. In an alternate version of my invention that transmission means is the ether.

The activation-signal generating means include pulse-generating equipment or means for generating the activation signals, and for transmitting the activation signals through the transmitter to the transceivers which in turn are connected to respective cameras; the radio-frequency transmitter includes means for sequentially multiplexing the activation signals with the synchronizing signals to form a composite signal for transmission to the transceiver.

Although frequency-multiplexing could also be used in principle, it is not further discussed here.

The composite signal is transmitted at a rate of one line scan signal per identifying signal per field of image information, and each of the receivers coupled to a respective camera includes circuitry for separating and decoding the activation signal, and determining if this activation signal is the proper identifying signal for the particular transceiver.

The radio frequency transmitter includes a first modulator for modulating the radio-frequency transmitter up to a 100% modulation depth by the synchronizing signals, and each of the radio-frequency transceivers includes a second modulator for modulating the transmitter portion of the monitor by the composite signals; only one of the transmitter portions of the transceivers in the cameras can be activated at a time, and the composite signal is generated with the activation signal and the common line and field synchronizing signals. The transmitter portions of the transceivers may be blanked during the transmission of the common line and field synchronizing signals by the monitor, when the transceivers are separated from the receiver-monitor by a distance relatively short compared to the distance covered by the radio-frequency propagation during each of the synchronizing signals, so that a common radio-frequency carrier is usable by the radio-frequency transmitter in the monitor and the transmitter portion of each of the cameras respectively. In an alternate embodiment of the present invention, the activation signal generating means are tone generator means, and the decoding means are tone-decoding means.

Each of the cameras may be repositioned in azimuth and elevation to respective predetermined angles by command signals, wherein the composite signal includes the command signals as well as the activation signal.

Applications of my invention include monitoring subway and train systems, including the monitoring of moving trains or subway trains by broadcasting from a moving train by means of, for example, a radiax slotted coaxial cable as manufactured, by Andrew Corporation, 10500 W. 153rd Street, Orland Park, Illinois 60462. Other applications are telecasting sports events, where a multiplicity of locations need to be covered, security systems for factories and stores, for example, supermarkets, monitoring systems in nuclear power generator plants, applications in classroom teaching and similar applications, where a plurality of views need to be explored, but only a single image is to be monitored at a time. All of the foregoing applications can make use of only a single carrier.

Applications where, because of the distances involved, two carriers need to be used i.e., full duplex transmission are, for example, space applications, such as planetary landers employing multiple cameras.

BRIEF DESCRIPTION OF THE DRAWING

My invention will be better understood with respect to the accompanying drawing in which.

DESCRIPTION OF THE PREFERRED EMBODIMENTS

Figure 1:
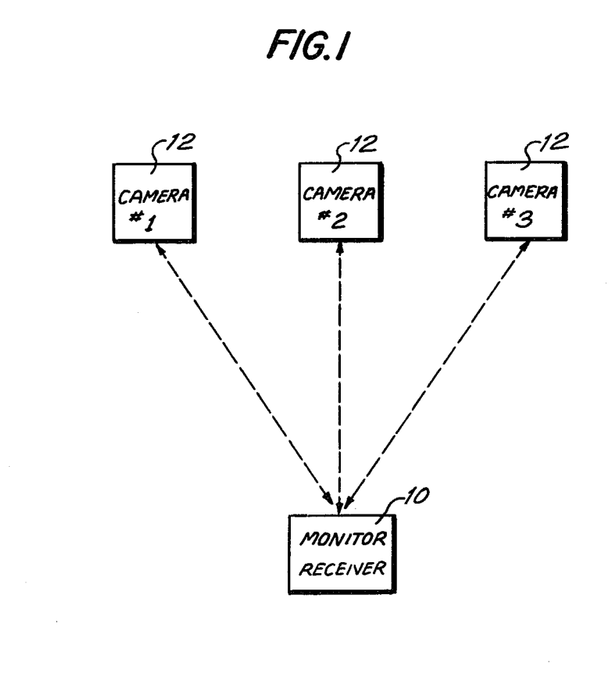
FIG. 1 shows a simplified schematic setup of the monitor-receiver and a number of cameras transmitting signals to the monitor-receiver.
Figure 2:
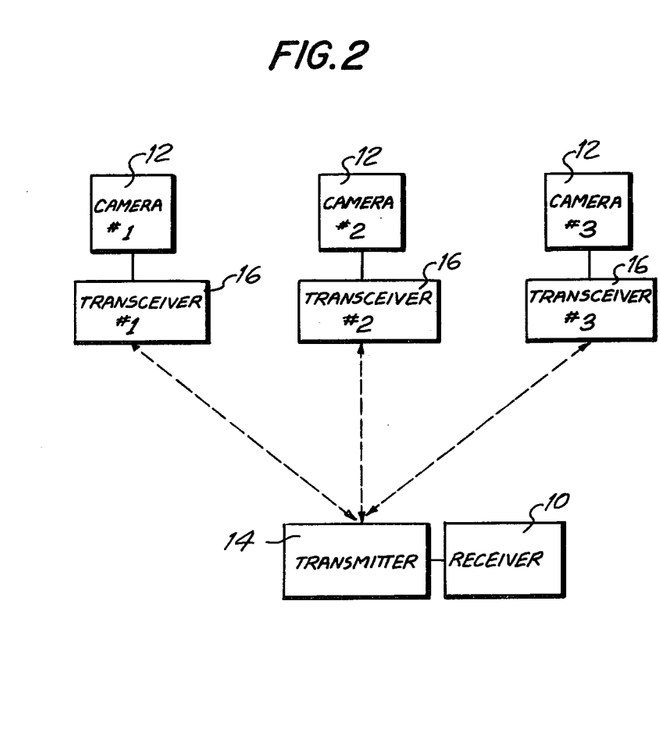
FIG. 2 shows the system according to FIG. 1 modified for transmitting the signals via the ether.

Referring now to the drawing, FIG. 1 shows a monitor-receiver 10 receiving selectively signals from three cameras 12. An operator located at the monitor-receiver 10 selects one of the three illustrated cameras shown, i.e., either camera 1, camera 2 or camera 3 for display on the television monitor 10. The cameras and the monitor-receiver may be linked either by cable, as shown in FIG. 1, or by a radio-link, as shown in FIG. 2; in the latter case the monitor-receiver has attached to it a transmitter 14, for transmitting command signals to transceivers 16 linked with respective cameras 12. Each transceiver 16 consists of a separate receiver for receiving command signals and activation signals from the operator of the television monitor 10, and a separate transmitter for transmitting the video signals back to the monitor-receiver 10 from the selected camera 12.

The system, according to the present invention, will be illustrated by means of a radio link, although any link between the monitor-receiver and the plurality of cameras can be used.

Figure 5:
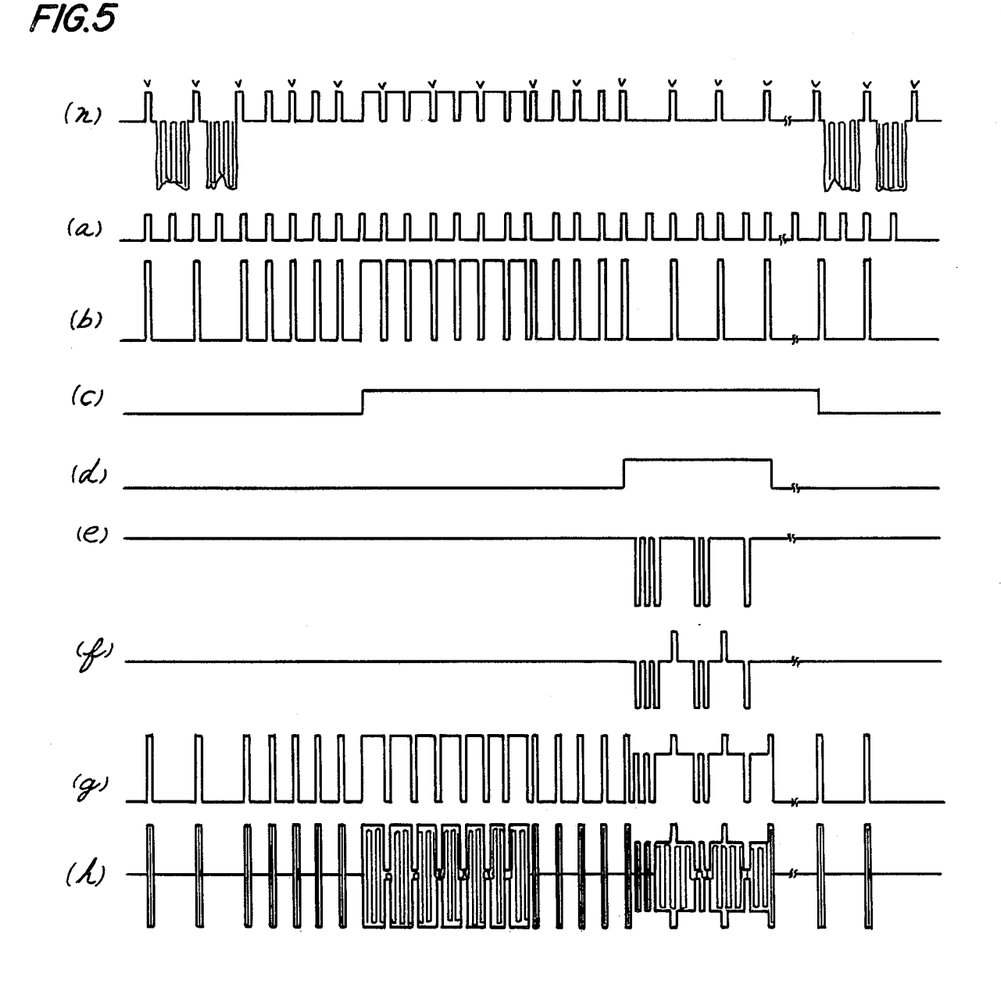
FIGS. 5a through 5h, and FIG. 5n show various waveforms occurring in the block circuit diagram of FIG. 3.

The system, according to my invention, uses a common circuit for generating synchronizing signals at the monitor-receiver for transmission to all of the cameras. As will be seen from FIG. 3, a clock pulse generator 18 generates clock pulses at twice the television line frequency. These clock pulses are shown in FIG. 5 as the waveform 5a. The clock signals are fed to a synchronizing-signal generator 20, which generates the synchronizing signals shown in FIG. 5b in the well known manner. The signals from the synchronizing signal generator 20 are fed to a video vertical blanking pulse generator 22, which generates a vertical blanking pulse in the well known manner, shown in FIG. 5c. The blanking pulses are then fed to a shaping circuit 24 which may consist, for example, of a delay circuit followed by a multi-vibrator to generate another blanking pulse delayed in time from the blanking pulse shown in FIG. 5c, and labelled as 5d in FIG. 5. The pulses shown in FIG. 5d occur during an interval immediately following the plurality of vertical blanking-pulse intervals shown in FIG. 5b, but prior to the time the video signals appear in the standard television waveform of the prior art at the commencement of a new field, as shown in FIG. 5a.

The output of the shaping circuit 24 is fed to an activation-signal pulse generator 26, which also accepts timing inputs from the clock pulse generator 18. The activation signal pulse generator 26 may, for example, be a pulse generator which generates timing pulses at predetermined intervals (pcm), as shown in the waveform of FIG. 5e, and which may be implemented in a well known manner. Other methods such as pulse width modulation (pwm) could also be used in principle. The pattern or timing of the individual pulses generated by the activation-signal pulse generator 26 is determined by a code selector 29, which can generate as many codes as there are transceivers attached to respective cameras 12. Since the activation signals are generated during a time period when the television receiver in the monitor 10 is blanked by a vertical blanking pulse, any signals appearing during the vertical blanking pulse time interval will not be seen on the television receiver-monitor 10. The output from the shaping circuit 24, i.e., the waveform shown in FIG. 5d, is also fed to an AND-gate 28, which accepts on its other input the output from the synchronizing signal generator 20 which is shown as the waveform of FIG. 5b. The output of the AND-gate 28, and the output of the activation-signal pulse generator 26 (shown in the waveform of FIG. 5e), are fed to an adder 30 in series with a clamper 32. The output of the clamper 32 is the waveform shown in FIG. 5f. It is the purpose of the clamper 32 to clamp the most negative-going portions of the waveform shown in FIG. 5f to ground. The output from the synchronizing signal generator 20 is also fed to an AND-gate 34, whose other input is fed from an inverter 36, which is itself fed from the shaping circuit 34. The output of the AND-gate 34 will therefore be synchronizing pulses, inhibited only during the time interval of the waveform shown in FIG. 5d. The output of the AND-gate 34 is fed to a clamper 38, in series with an adder 40, which latter also accepts on its other input the output from the clamper 32 shown in the waveform of FIG. 5f. The output from the adder 40 is shown as the waveform of FIG. 5g, containing both synchronizing signals and activation signals in the proportions shown in FIG. 5g. The output from the adder 40 is fed to a modulator 42, which modulates a transmitter 44, and the output from the transmitter 44 is shown as the waveform of FIG. 5h.

The waveform of FIG. 5h will be seen to be a radio frequency oscillation-train, amplitude-modulated by the waveform of FIG. 5g. It is of course possible to convert the amplitude modulated waveform shown in FIG. 5h into the customary vestigial side band output used in television transmission in a well known manner.

Figure 6:
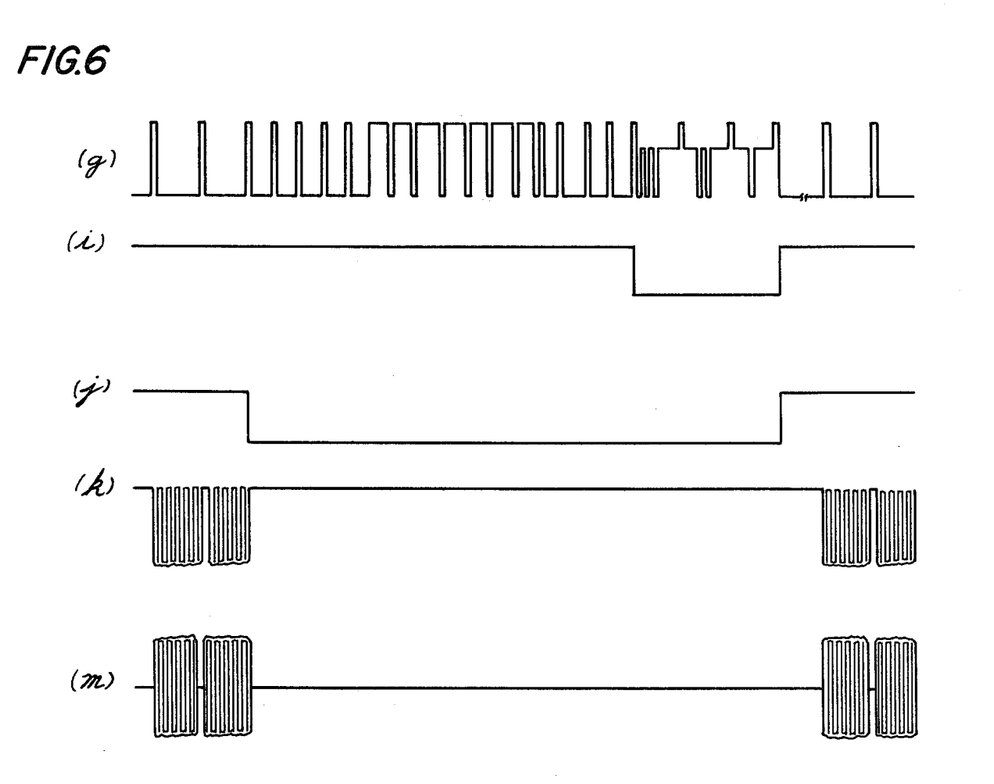
FIGS. 6g through 6m show various waveforms occurring in the block circuit diagram of FIG. 4.

The signal transmitted by the transmitter 44, is received by the receiver portion of a transceiver 16 and passed to a video detector 46, emerging therefrom as the demodulated waveform shown as 5g. The output of the video detector 46 is passed to a synchronizing signal separator 48, which strips the synchronizing signals from the waveform of FIG. 5g, resulting in the waveform shown in FIG. 5b. This waveform is passed to a video vertical blanking pulse generator 50, which outputs a vertical blanking pulse as shown in FIG. 5c. The latter waveform is passed to a shaping circuit 52, which reshapes the waveform of FIG. 5c into the waveform shown in FIG. 5d, and feeds it to an activation-signal pulse generator 54, which is substantially similar in design to the activation-signal pulse generator 26. The output of the shaping circuit 52 is also fed to an inverter 56, and then into an AND-gate 58, whose other input is the waveform in FIG. 5g from the video detector 46. Since the activation signals, as shown in FIG. 5e, are negative-going, and the wave shape shown in FIG. 5i is also negative-going, the output of the gate 58 results in the waveform of FIG. 5e. The waveform of FIG. 5e is, however, also outputted by the activation signal pulse generator 54 only when the television camera is the one selected by the monitor. If these two waveforms coincide, the decoder 60, which is substantially a coincidence circuit for every pulse of the activation signal generator, will transmit an enabling pulse to the transmitter 14. A second shaping circuit 62 fed by the output from the video vertical blanking pulse generator 50, is fed to the camera, the latter also accepting the output from the synchronizing signal separator 48, so that the synchronizing pulses and the input for a vertical blanking waveform are fed to the camera 12 for generating the camera television raster in the usual manner. The video signals from the camera 12 are fed to a modulator 64, and therefrom to the transmitter 14. The output from the shaping circuit 62 is shown in FIG. 6j, the video signals from the camera 12 are shown in FIG. 6k, and the amplitude-modulated transmitter waveform generated by the transmitter 14 is shown in FIG. 6m. It will be understood that a transmitter 14 may also output the conventional vestigial side band waveform used in television transmitters.

Figure 4:
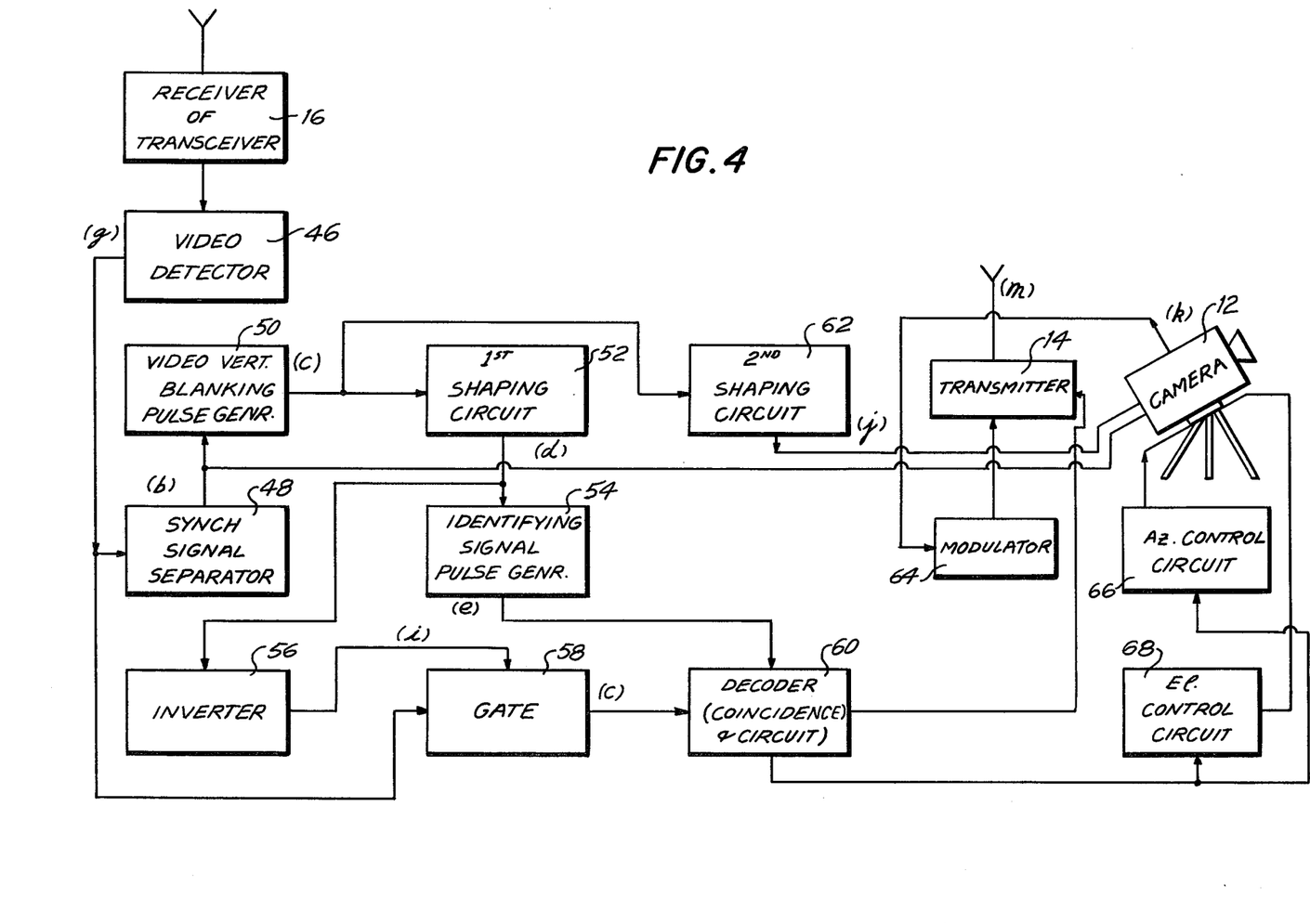
FIG. 4 shows a block diagram of the decoding circuit at the transceiver.

One of the transmitters 14 is therefore only enabled in the event the code selector 28 has selected the code corresponding to a particular transmitter 14, when the decoder 60 transmits an enable signal to the particular transmitter 14. If the coding selector has selected an activation signal of the identifying signal pulse generator 26 which differs from the signal generated by the activation signal pulse generator 54, then no output from the decoder 60 is obtained, and the corresponding transmitter 14 is not enabled.

The composite signal is composed of the activation signal and command signals for control of the azimuth or elevation of the camera 12; the latter signals are similar in form to the activation signals. The azimuth and elevation control signals are then fed to corresponding azimuth and elevation digital-to-analog decoder circuits 66 and 68, not further illustrated, which convert the azimuth and elevation PCM signals into analog azimuth and elevation signals, respectively, which are suitably smoothed. The azimuth and elevation control signals may follow the activation signals after a predetermined interval and may be separated from the latter by conventional gating circuitry. They are used for controlling the azimuth and elevation, respectively, of a respective camera 12 by non-illustrated servo-motors; since such circuits are well known, they will not be described in detail.

Figure 3:
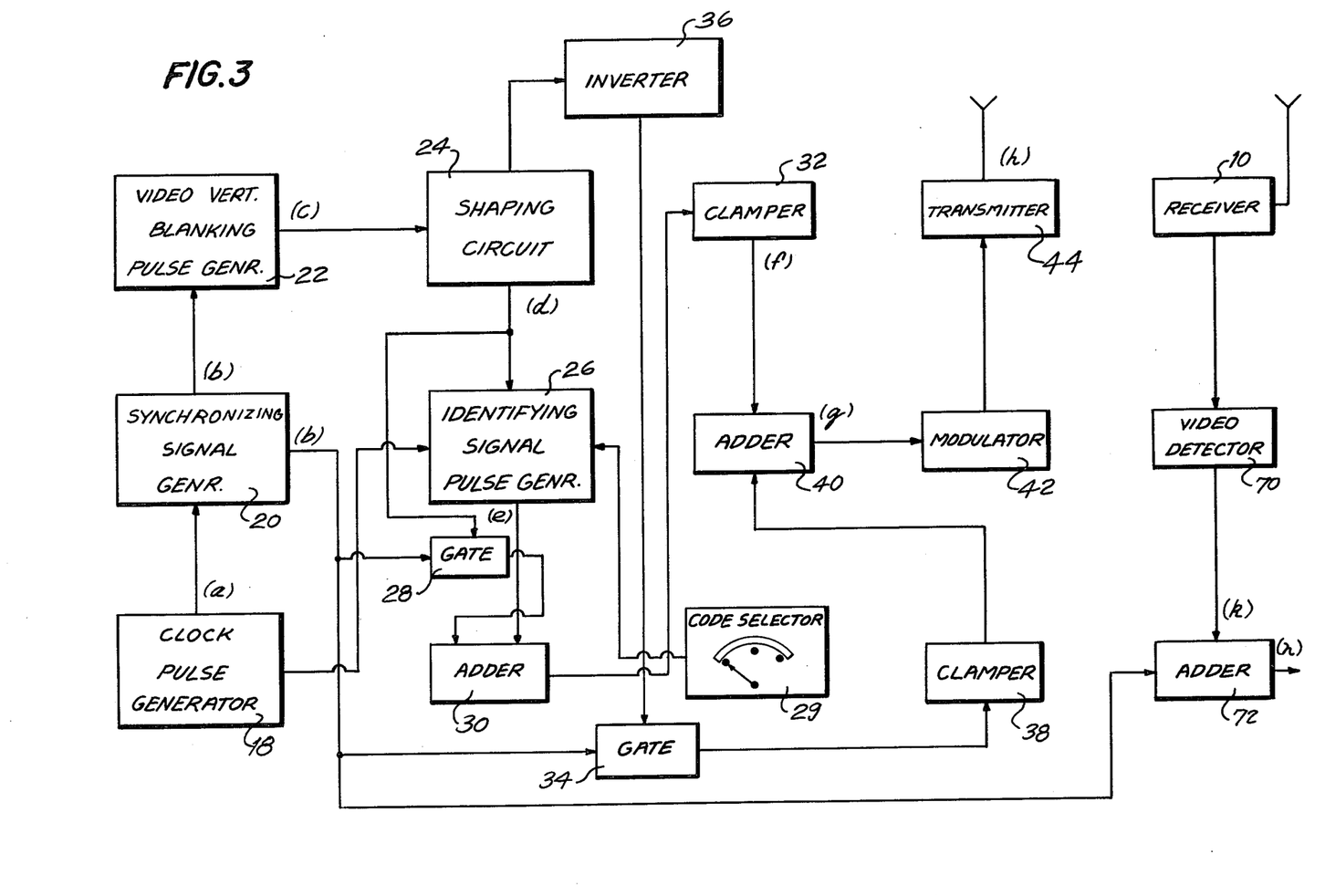
FIG. 3 shows a block diagram of the common synchronizing signal, and activation-signal generating circuit at the monitor-receiver.

The signal outputted by the transmitter 14 is received by the receiver 10, best seen in FIG. 3, and fed to its video detector 70. Since the output of the transmitter 14 is devoid of synchronizing signals, these are added to the receiver circuitry by an adder 72 which receives inputs from the synchronizing signal generator 20, and from the video detector 70, resulting in an output as shown in FIG. 5n, i.e., the conventional video waveform includes video signals and synchronizing signals.

Figure 7:
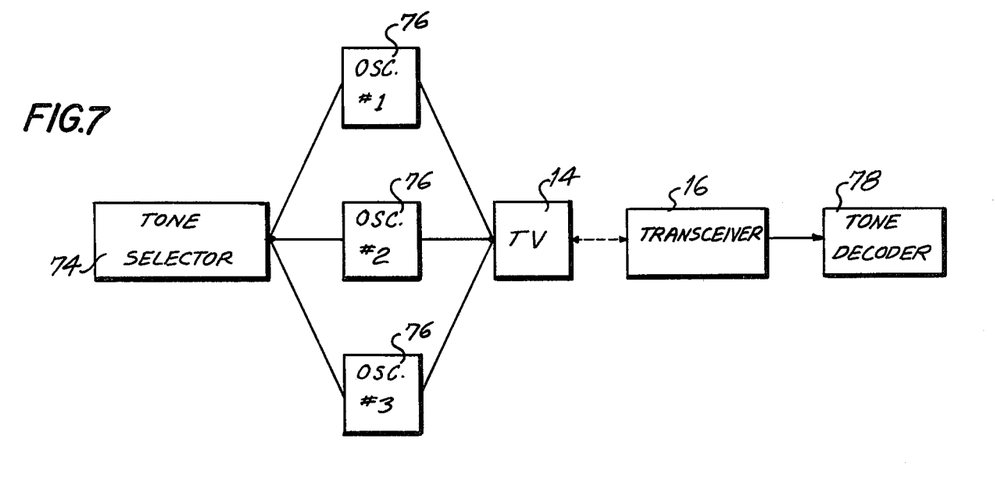
FIG. 7 shows an alternate embodiment of an activation signal generator and a decoder therefor.

The activation signal generator need not be implemented as a pulse generator 76, as shown in FIG. 7, but could also be a tone generator 76, the tone being transmittable via the television audio channel, and the decoder would consequently be a tone decoder 78, each being selectable by a tone selector 74. Tone coding and decoding is not further described, as it is well known in the art. The code or tone selector, although shown for manual operation, may also be sequenced automatically by non-illustrated means according to a predetermined selection sequence of the cameras, and its associated transceivers. Implementation of the activation signals by means of pulses, as described, has the advantage, however, that the audio channel remains free for normal use.

It will be noted that the system, according to my invention, permits communication of the monitoring system with one of the transmitters selected in a half-duplex manner; that means that only a single radio frequency carrier need be used, and that the saving in the transmitted, or utilized frequency spectrum is therefore possible, provided that the distance of the transceivers from the television receiver is small compared to the radio frequency propagation time of a line synchronizing pulse.

Although the invention has been described with respect to a preferred version thereof, it is to be understood that it is not to be so limited, since changes can be made therein which are within the full intended scope of the appended claims.

What is claimed is:

1. A system for selectively transmitting television images including video signals comprising:
a plurality of television cameras for generating image signals, said cameras being placeable at different respective locations; and
at least a single television receiver for selectively receiving and monitoring one of said image signals, said receiver including means for generating common line and field synchronizing signals for said cameras, and activation-signal generating-means for generating activation signals for said cameras, respectively, said activation signals and said synchronizing signals being transmittable to said cameras, respectively, as electronic signals via transmission means a camera being selectively activated by an activation signal transmitted from said activation-signal generating means to the selected camera.

2. A system according to claim 1 wherein each of said cameras includes a radio-frequency transceiver, and said receiver includes a radio-frequency transmitter for transmitting said synchronizing signals to said transceivers, and wherein the transmission means is the ether.

3. A system according to claim 2 wherein said activation-signal generating means comprise pulse-generating means for generating said activation signals and for transmitting said activation signals through said transmitter to said transceivers, wherein said radio-frequency transmitter includes means for synchronizing signals to form composite signals for transmission to said transceivers, the multiplexing of said activation signals being performed at a rate of one line scan signal per activation signal per field of image information, and wherein each of said transceivers includes means for separating and decoding a pre-determined activation signal present in each composite signal received at said transceiver.

4. A system according to claim 2 wherein each of said cameras is repositionable in azimuth and elevation to respective predetermined angles by command signals, and wherein said activation signals include the command signals.

5. A system according to claim 2, wherein the activation signal generating means are tone-generator means, and wherein the decoding means are tone-decoding means.

6. A system for selectively transmitting television images including video signals comprising:
a plurality of television cameras for generating image signals, said cameras being placeable at different respective locations; and
at least a single television receiver for selectively receiving and monitoring one of said image signals, said receiver including means for generating common line and field synchronizing signals for said cameras, and activation-signal generating-means for generating activation signals for said cameras, respectively, said identifying signals and said synchronizing signals being transmittable to said cameras, respectively, as electronic signals via transmission means, said cameras including a radio-frequency transceiver, and said receiver includes a radio-frequency transmitter for transmitting said synchronizing signals to said transceivers, and wherein the transmission means is the ether, said activation signal generating means comprising pulse-generating means for generating said activation signals and for transmitting said activation signals through said transmitter to said transceivers, wherein said radio-frequency transmitter includes means for synchronizing signals to form composite signals for transmission to said transceivers, the multiplexing of said activation signals being performed at a rate of one line scan signal per activation signal per field of image information, and wherein each of said transceivers includes means for separating and decoding a pre-determined activation signal present in each composite signal received at said transceiver.

7. A system according to claim 6 wherein said radio-frequency transmitter includes a first modulator for modulating said radio-frequency transmitter up to a 100% modulation depth by said synchronizing signals, wherein each of said radio-frequency transceivers includes a second modulator for modulating the transmitter portion of the transceiver by the composite signals, only one of the transmitter portions of said transceivers being activatable at a time, said activation signals being generatable during the field synchronizing signals, the transmitter portions of said transceivers being blankable during said field synchronizing signals when said transceivers are separated from said receiver by a distance relatively short compared to the distance covered by radio-frequency propagation during each of the synchronizing signals, whereby a common radio frequency carrier is usable by said radio-frequency transmitter and the transmitter portion of each of said transceivers, respectively.

* * * * *

UNITED STATES PATENT AND TRADEMARK OFFICE
CERTIFICATE OF CORRECTION

PATENT NO. : 4,091,422
DATED : May 23, 1978
INVENTOR(S) : AMSTER

It is certified that error appears in the above-identified patent and that said Letters Patent are hereby corrected as shown below:

Figure 3, block 26 and Figure 4, block 54, please change "Identifying Signal Pulse Genr." to --Activation Signal Pulse Generator--.

Signed and Sealed this

Second Day of January 1979

[SEAL]

Attest:

RUTH C. MASON
Attesting Officer

DONALD W. BANNER
Commissioner of Patents and Trademarks